Patented July 16, 1935

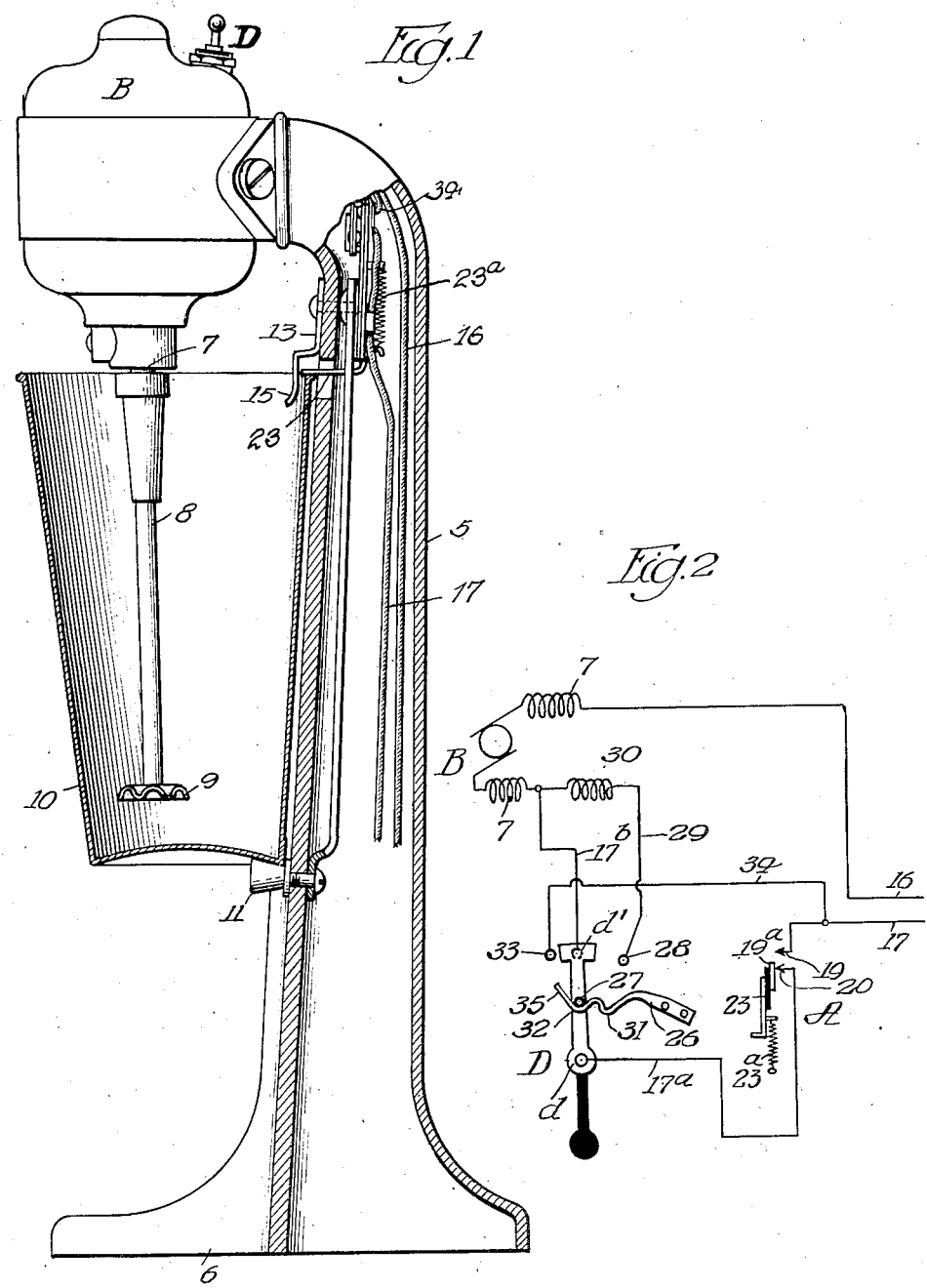

2,008,223

UNITED STATES PATENT OFFICE 2,008,223

ELECTRIC DRINK MIXER

Victor A. Partz, Chicago, Ill., assignor to Hamilton Beach Manufacturing Company, Racine, Wis., a corporation of Wisconsin Application June 15, 1933, Serial No. 675,873

3 Claims. (Cl. 259—108)

The invention relates to electric drink mixers.

In the use of electric drink mixers at soda fountains and other places, it has been found that when the constituents of the drink to be mixed contain ice cream or cream, a high speed of the agitator, ranging from 10 to 15 thousand revolutions per minute, is necessary to effect the desired blending of the materials and for that reason the motor is usually adapted to run at corresponding speeds.

It has been found that in mixing other drinks, such as those which contain chipped ice, flavoring material, and powder, a substantially lower speed of the agitator is necessary to effect the desired mixing and to prevent the material from being splashed out of the container.

One object of the present invention is to provide an improved electric drink mixer which is adapted, through variation of the speed of the motor, for properly mixing these different kinds of drinks.

Another object of the invention is to provide a mixer of that type in which the motor is automatically started and stopped by placement of the container in its operative position, with means for varying the speed of the motor for mixing these different kinds of drinks.

Another object of the invention is to combine with a mixer adapted for mixing different kinds of drinks, means for independently and manually starting and stopping the motor when it is desired to fluff the contents of the container.

Other objects of the invention will appear from the following detailed description.

The invention consists in the several novel features which are hereinafter set forth and which are more particularly defined by claims at the conclusion hereof.

In the drawing, Figure 1 is a view partly in section and partly in elevation of a drink mixer embodying the invention. Fig. 2 is a diagrammatic view of the electrical connections and devices for controlling the motor and agitator.

The invention is exemplified in a drink mixer comprising a hollow standard 5 which rises from a base 6 and has an electric-motor B secured to its upper end. A shaft 8 depends from and is fixed to the rotor of the motor and has secured to its lower end an agitator 9 for the contents of a container 10, as well understood in the art. A stud 11 is secured to the front face of the standard 5 to support, or serve as a rest for, the bottom of the container. A plate 13 is secured to the upper portion of the standard 5 and is shaped at its lower end to form a hook 15 which is adapted to enter the open top of the container 10 to hold the latter in operative position on the stud 11 when the rim is slipped upwardly into the hook. There is sufficient clearance below and around the agitator 9 to permit the container 10 to be lifted from below into its operative position by manual manipulation of the container itself, so it will rest on stud 11 and be held by the hook. In placing the container in its operative position, its upper rim is guided into the hook 15 by the front face of standard 5 and its bottom portion is then moved backwardly to rest on stud 11. The container may be removed by reverse manual manipulation.

The motor B is supplied with current through a pair of line-conductors 16 and 17. Conductor 16 is directly connected to one of the field-windings 7 of the motor. The line-conductor 17 is connected to the contact 19 of an automatic switch A which is actuated to start the motor by the placement of the container into operative relation to the agitator, and to stop the motor upon removal of the container. Switch A comprises a contact 20 which is adapted to be electrically connected to contact 19 by a bridge-contact 19$^a$ which is carried by and insulated from a member 23 which extends through an opening 25 in the standard into the path of movement of the rim of the container 10 when the latter is shifted into its operative position. Member 23 will hold contact 19$^a$ to close the motor circuit at the switch A to keep the motor running so long as the container remains in its operative position. A spring 23$^a$ is applied to member 23 to hold the switch A normally open. This switch may be of the construction described in detail in Patent No. 1,764,337 dated June 17, 1930.

A manually operable switch D is included in the motor circuit between contact 20 and one of the field windings 7 of the motor B. This switch is mounted in the top of the motor-casing and comprises a lever $d$ which, for high speed operation of the motor, is held in position to engage a contact $d^1$ which is connected by a conductor 17$^b$ to one of the field windings 7. A spring 26 engages a stud 27 on the lever $d$ to hold yieldingly and normally the lever into position to engage contact $d^1$. This spring has a V-shaped portion 32 whereby the lever $d$ will be held in position to engage contact $d^1$ as long as automatically controlled high-speed operation is desired. Normally, for high speed operation, the lever $d$ will be held in the position illustrated in Fig. 2 by spring 26. When the container is placed into its operative relation to the agitator, it will shift and hold member 23 to close switch A and this will automatically establish the following circuit for high speed operation of the motor: conductor 17, contacts 19, 19a, 20, conductor 17a, lever $d$, contact $d^1$, conductor 17b, the field windings of the motor, and line-conductor 16. When the container is removed, member 23 will be retracted downwardly by springs 23a to interrupt said circuit at contacts 19, 20, and stop the motor. This high-speed operation of the motor is available for drinks containing ice cream, cream, malted milk and flavoring materials with automatic starting and stopping of the motor, by manipulation of the container.

When it is desired to mix a drink containing chipped ice, powder, and flavoring material, low speed operation is necessary and desirable. For this purpose, a contact 28 is positioned to be engaged by lever $d$, and a conductor 29 in which is included a supplemental field winding 30, is connected to contact 28 and to the conductor 17b so the motor circuit between the automatic switch A and the motor will cause the motor to operate at a relatively low speed. When low speed operation is desired, the operator will shift lever $d$ away from contact $d^1$ and into engagement with contact 28. The supplemental field winding 30 is such that when it is excited together with the regular field winding 7 the motor is caused to rotate at low speed. With the lever so set, placement of the container in operative position will close the switch A and establish a motor circuit through conductor 17, contacts 19, 19a, 20, conductor 17a, lever $d$, contact 28, conductor 29, supplemental field winding 30, the field windings of the motor and conductor 16. This circuit will cut in the coil 30 to cause the motor to operate at a relatively low speed. The mixer will remain available for low speed mixing as long as the lever $d$ is left in engagement with contact 28. Spring 26 is formed with a V-shaped portion 31 into which the stud 27 will seat when the lever is shifted to engage contact 28 so that the lever will be held in engagement with contact 28 until the lever is shifted to one of its other positions. While the lever $d$ is set for low speed operation, the motor and agitator will be started and stopped automatically by the closing and opening of the switch A by the container so that the low speed operation will also be automatically controlled. This construction exemplifies means for producing low speed operation of the motor with automatic starting and stopping of the motor through the shifting of switch A by manual manipulation of the container.

To fluff the contents of the container, the latter is manually held so the agitator will operate in the upper portion of the contents and while the container is off the stud 11. The switch-lever $d$ is shiftable into a third position to engage a contact 33 which is connected by a conductor 34 to the line-wire 17. Lever $d$ is adapted to bridge contacts $d^1$ and 33 and to be manually held into such bridging contact. While the lever is so held, current for high speed operation will pass from the motor $b$ through conductor 17b, contact $d^1$, lever $d$, contact 33 and conductor 34 to the line-wire 17 to cause the motor to operate at high speed. The end 35 of spring 26 is shaped to retract lever $d$ and separate it from contact 33 as soon as it is released by the operator. As a result, the lever will be automatically shifted into position for high speed operation under automatic control of switch A after each fluffing operation. This exemplifies a manually operable switch for causing the motor to operate independently of the automatic switch A for fluffing drinks and which will be automatically retracted for automatic high speed control when the lever is released by the operator, in connection with the two-speed automatic control.

The invention exemplifies a drink mixer equipped with means for operating the motor at different speeds under control of an automatic or container-shifted switch with manual means for controlling the speed of the motor for different drinks. The invention also exemplifies, in connection with the high and low speed control, independently operable switch means for controlling the operation of the motor for fluffing drinks when the container is out of its operative position.

The invention is not to be understood to be restricted to the details set forth since these may be modified within the scope of the appended claims without departing from the spirit and scope of the invention.

Having thus described the invention, what I claim as new and desire to secure by Letters Patent, is:

1. In a drink mixer of the character described the combination with means for holding a container, an electric motor and an agitator driven by the motor, of means for controlling the operation of the motor comprising, an automatic switch operable by the container, a connection between the automatic switch and the motor for operating the latter at high speed, a connection between the automatic switch and the motor including means for reducing the speed of the motor, means for selectively controlling the connections to operate the motor at high and low speeds, and a connection, controlled by said last mentioned means, for operating the motor independently of the automatic switch.

2. In a drink mixer, the combination with means for holding a container, an electric motor and an agitator driven by the motor, of means for controlling the operation of the motor comprising, an automatic switch operable by the container, a connection between the automatic switch and the motor for operating the latter at high speed, a connection between the automatic switch and the motor including means for reducing the speed of the motor, manually operable means for selectively controlling the connections to operate the motor at high and low speeds, and a connection, controlled by said manually operable means, for operating the motor independently of the automatic switch.

3. In a drink mixer, the combination with means for holding a container, an electric motor and an agitator driven by the motor, of means for controlling the operation of the motor comprising, an automatic switch operable by the container, a connection between the automatic switch and the motor for operating the latter at high speed, a connection between the automatic switch and the motor including an auxiliary winding for reducing the speed of the motor, a connection for operating the motor independently of the automatic switch, and a single device for selectively controlling all of said connections.

VICTOR A. PARTZ.